Patented Sept. 18, 1951

2,568,216

UNITED STATES PATENT OFFICE 2,568,216

METHOD OF MAKING RESINS OF TURPENTINES AND VINYL CYCLOHEXENE

Samuel G. Burroughs, Pittsburgh, Pa., assignor to Pennsylvania Industrial Chemical Corporation, Clairton, Pa., a corporation of Pennsylvania No Drawing. Application August 23, 1948, Serial No. 45,783

7 Claims. (Cl. 260—88.1)

This invention relates to a resin composed of mixed vinyl cyclohexene and terpene polymers.

1-vinyl cyclohexene-3 is produced as a derivation of cyclohexene and cyclohexadienes in by-products from catalytic processes such as processes of making butadiene. As produced it is associated with cyclohexanol and related alcohols in a combined proportion of about 10% to 15% of those substances. This impure, approximately 85%, vinyl cyclohexene polymerizes under the influence of aluminum chloride and related acid-reacting metal halide catalysts very slowly and incompletely to form two types of resin, one of which has a melting point of about 100 and is soluble in mineral spirits at normal room temperature, and the other of which is infusible and is insoluble in all commonly used organic solvents. These two types of resin are formed approximately simultaneously and separate from each other with precipitation of the insoluble type. Because of poor yield and the impossibility of directing the polymerization reaction, the impure vinyl cyclohexene is to be considered valueless as a starting material for the production of resin of either type. I have, however, found that by purifying the vinyl cyclohexene and by subjecting it to polymerization in association with turpentines, I am able to obtain good yields of solid resins.

Any suitable purification procedure may be followed to obtain an approximately pure vinyl cyclohexene starting material. One specific procedure which I have advantageously followed is to wash the impure vinyl cyclohexene by-product with 59° Baumé sulphuric acid (74%) at 5° C. The product of the purification consists of at least about 95% of pure vinyl cyclohexene responding apparently to the formula

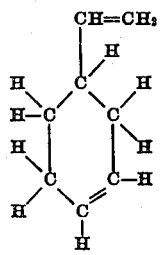

This acid washed vinyl cyclohexene has a specific gravity of 0.8336 at 15.5° C., a boiling range of 125° C. to 131° C., a bromine number of 280, and a refractive index of 1.464 at 20° C. This material when diluted with a hydrocarbon diluent, such as toluol, and subjected to a polymerization reaction with aluminum chloride, or its substantial equivalent as a catalyst, gives a yield of about 80% of infusible insoluble resin, and about a 20% yield of resin having a melting point of 80° C. (ball and ring) which is soluble in mineral spirits at normal room temperature. There is a great diversity in the properties of the diverse types of resin so produced inasmuch as the insoluble type is not soluble to any appreciable extent in toluol, acetone, alcohol, ethyl-acetate, carbon tetrachloride, or mineral spirits, with heating. It also is not soluble in molten coumarone-indene resin, or molten terpene resin. The insoluble type of vinyl cyclohexene resin does not melt up to its decomposition point. A less carefully acid washed vinyl cyclohexene, which I also have used, is between 85% and 90% pure.

Whereas the two diverse resins of the insoluble and the soluble types have each its individual utility, I have discovered that a more useful product is obtainable by polymerizing a mixture of the vinyl cyclohexene, which as shown in the formula is a mixed cyclic and open chain material, in a mixture with one or more of the turpentines comprising mono or bi-cyclic terpenes boiling under 200° C. Apparently such resin is in part at least the result of copolymerization, inasmuch as up to a certain percentage of the vinyl cyclohexene only soluble polymers are formed and the resultant resin is obtained in higher yield and has a higher melting point than the theoretical average to be anticipated from the mixture.

Turpentines of the several well known commercial species differ in the variety and proportion of their constituents as well as in the methods of their production. Thus gum spirits of turpentine, which is derived by tapping live conifers and by distillation of the liquids thus obtained normally consists over 95% of alpha-pinene and beta-pinene, the relative proportions of those two ingredients being roughly about 70% of alpha-pinene and about 30% of beta-pinene. Wood turpentine which is derived by solvent extraction of chips from the stumps of conifers is composed roughly about 40% of alpha-pinene, about 40% of dipentene, and about 20% of other terpenes including beta-pinene, terpinene, terpinolene with minor quantities of various cyclic and bi-cyclic terpenes responding to the general basic formula $C_{10}H_{16}$. Sulphate turpentine which is extracted from the waste produced in the process of making sulphate pulp from the wood of conifers consists roughly about 60% alpha-pinene, about 25% beta-pinene, about 10% dipentene, and about 5% of various other terpenes.

As a general procedure the vinyl cyclohexene which has been brought to a greater or lesser order of purity is mixed with one or more of the turpentines and with an organic diluent which is substantially inert to polymerization with the vinyl cyclohexene and the terpenes, and is brought into reactive contact with an acid-reacting metal halide polymerization catalyst, such as anhydrous aluminum chloride, aluminum bromide, stannic chloride, titanium tetrachloride, antimony pentachloride, and ferric chloride and the corresponding bromides of these latter metals, aluminum chloride and aluminum bromide being preferred. During the progress of the polymerization reaction the reaction temperature is maintained within a range which desirably is suitable for relatively rapid polymerization without reaction surge, such as a temperature within the approximate range of about 0° C. to 80° C., a temperature of about 35° C. to 60° C. being considered optimum from the viewpoint of reaction speed and ease of temperature control.

Upon the completion of catalyst addition, which is desirably effected without such rapidity as to cause a surge, agitation of the reaction mixture is continued for a substantial period of time completely to polymerize the vinyl cyclohexene which appears to lag in the combined polymerization reaction.

To remove the catalyst at the end of the polymerization treatment two standard recovery methods may be employed. In accordance with one such procedure the mixture is drowned with a 5% water solution of hydrochloric or sulphuric acid, and is then water washed and neutralized with a 10% water solution of sodium carbonate. The washed solution is then warmed to 80° C. and is allowed to settle until a clear resin solution is obtained. Such resin solution is distilled, desirably at a still temperature of about 210° C., and is then steam distilled at still temperatures within the range of about 210° C. to 260° C. until a resin of the desired softening point remains as a residue.

The other method of removing catalyst and recovering solid resin tends to give a somewhat lighter color than the method described above. In accordance with this latter procedure the polymerization mixture is allowed to settle until the metal halide sludge separates out, which separation is complete within about one hour to twenty-four hours. The solution is decanted off, the sludge is washed with a suitable organic solvent, such as refined solvent naphtha, and the washings are added to the resin solution. The combined resin solution thus obtained is clear, but is deep red in color due to the retention of a soluble complex of the metal halide. This clear but highly colored solution is purified by refluxing it at still temperature of about 140° C. to 150° C. with fuller's earth having but slight acidity, which is not of necessity dry, and slacked lime for a period of three hours. During this treatment hydrochloric acid is driven off and the original soluble aluminum chloride complex comes down as a precipitate. An appropriate quantity of clay for use in the reflux purification is about 7.5% of the total weight of vinyl cyclohexene and alpha-pinene and a quantity of lime equal to the weight of the clay desirably is used. As low as 5% clay and lime may be used and as much may be used as will not interfere with the refluxing. Up to as much as 15% to 20% each of clay and lime is usable. After refluxing, the resin solution is filtered and a clear light yellow resin solution is obtained, one of the common commercial filter aids desirably being used during the filtering. This resin solution is then steam distilled, desirably at still temperatures of about 210° C. to 260° C., until solid resin of the desired melting point remains as a residue.

The above recovery procedure results in the production of a resin of particularly light color, but does so at the sacrifice of a small proportion of the resin yield which is retained in the sludge initially separated from the resin solution. This proportion of the resin carried down with the suldge may largely be recovered by drowning the sludge with a 5% water solution of hydrochloric acid or sulphuric acid, then agitating the resin with an organic solvent, such as distilled solvent naphtha, and distilling off the solvent. This leads to recovery of entrapped resin which is of darker color than that obtained by steam distillation of the resin solution.

It has been noted that the mixture of vinyl cyclohexene and selected turpentine is diluted with an organic solvent diluent inert to polymerization under conditions of the process. That diluent preferably is one of the low aniline point organic solvents which is inert in the process, as for example one of the aromatic hydrocarbon solvents which have no unsaturation outside the benzene ring, such as benzol, toluol, xylol, refined solvent naphtha and ethyl benzene, or one of the chlorinated aromatic solvents, such as chlorobenzol. Regardless of the specific solvent which is used, mostly desirably it is included in a quantity not substantially less than 30% the total reaction liquid in order to maintain activity as polymer formation proceeds. It can be included in any greater quantity subject to the practical consideration that increased volume of diluent tends to slow the reaction and to increase the reaction time, and also to require that an increased quantity of catalyst be used in order to make reactive contact with the polymerizable vinyl cyclohexene and turpentine. Also it is uneconomical to use and distill off more diluent than performs a useful purpose during the polymerization reaction. As a practical consideration I prefer to include the diluent in no more than about 80% of the total volume of the reaction mixture.

I have found that in using anhydrous aluminum chloride or aluminum bromide as the polymerization catalyst as little as 2% by weight of such catalyst with respect to the combined weight of the vinyl cyclohexene and turpentine is sufficient to effect complete polymerization, and even less than 2% may usefully be employed. Preferably I utilize anhydrous aluminum chloride or aluminum bromide in a quantity equal to about 4% to 15% the weight of the combined vinyl cyclohexene and turpentine in accordance with the other conditions of the process. Quantities of those catalysts over 25% effect no appreciable shortening in the time required for the polymerization reaction even when conduct of the polymerization at low temperature indicates the use of a relatively large proportion of catalyst, unless a particularly great volume of diluent also be used. In proportioning the catalyst to the polymerizable constituents of a reaction mixture the other metal halide catalysts of the Friedel-Crafts type which have been noted above can usefully be proportioned to the above preferred quantities of anhydrous aluminum chloride and aluminum bromide. In substituting aluminum bromide and the other metal halide catalysts for the aluminum chloride, the optimum proportion of catalyst to the polymerizable content of the reaction mixture is desirably increased or decreased with respect to the quantity of aluminum chloride used in proportion as the molecular weight of that particular catalyst is greater or less than that of aluminum chloride.

It has been noted above that in subjecting a mixture of vinyl cyclohexene and selected turpentine to polymerization the vinyl cyclohexene functions in the mixture to raise the melting point of the resin which may be recovered. It is to be noted that this function is performed down to the least proportion of vinyl cyclohexene which gives a perceptible increase. That minimum proportion is, as will be exemplified herein, below 15% of vinyl cyclohexene in the mixture of that material with the turpentine, if in fact there is any proportion which may be considered as an absolute minimum exerting no measurable effect on the product resin. For purposes of practical definition of the point at which the effect of including vinyl cyclohexene becomes negligible, I give 10% as a minimum. In seeking to obtain resin of particularly high melting point the proportion of vinyl cyclohexene to turpentine can be increased for the production of high melting thermoplastic resin up to a point at which the proportion of insoluble polymers renders further increase in the proportion of the vinyl cyclohexene uneconomical. I have found the best average results with respect to the softening point of the thermoplastic resin which is produced and the yield of such thermoplastic resin are obtained when the vinyl cyclohexene constitutes about 25% to 45% of the polymerizable mixture, there being an appreciable production of insoluble resin when equality in the weights of the two ingredients is approached with rapid increase above that point.

My starting material for polymerization thus comprises a mixture of a selected turpentine or turpentines and vinyl cyclohexene in which the vinyl cyclohexene is included in a proportion of from 10% to 50% of the total blend and most desirably in a proportion of from 25% to 45% of the blend in order to obtain maximum inclusion of vinyl cyclohexene in the resin polymers without forming insoluble polymers, the proportions being by weight.

It is to be understood that each of the turpentines conjointly with which I polymerize vinyl cyclohexene is itself a mixture of mono-cyclic or bi-cyclic terpenes boiling below 200° C., and that commingling these turpentines for further mixture with the vinyl cyclohexene gives a starting material analogous to that of a mixture of the vinyl cyclohexene with any one of the turpentines. The proportions of the various terpenes included in the turpentine content of the starting material is in such case based both on the proportions in which those terpenes are present in the turpentines which are included and the relative proportions of those included turpentines. In a mixture which contains a substantial proportion of vinyl cyclohexene the contribution of the terpene mixtures to the polymer constitution of the recovered resin is sufficiently close to permit identical conditions to be employed for all such terpene mixtures. The differences which appear are in the yield and softening point of the hard resin ultimately recovered as the residue of distillation. In each exemplification given below, the proportioning of vinyl cyclohexene to turpentine in the starting liquid is such as to avoid any substantial production of insoluble resin.

The following examples are illustrative of our method of producing mixed vinyl cyclohexene and terpene resins.

*Example 1*

A mixture was made of 100 cc. (83 gm.) of acid washed vinyl cyclohexene about 90% pure, and 140 cc. (119 gm.) gum spirits of turpentine, boiling over 90% within the range of 150° C. to 170° C. (vapor temperature), and consisting in substantial entirety of alpha-pinene and beta-pinene in the approximate proportion by volume of 70% alpha-pinene and 30% beta-pinene. This was mixed with 300 cc. of toluol and agitated in a vessel equipped for heat abstraction by the external circulation of a refrigerated brine solution. During the course of an hour and one-half 10 grams of aluminum chloride was added in small increments and was brought by agitation into reactive contact with the vinyl cyclohexene and terpenes of the starting mixture. When all the aluminum chloride had been added, agitation was continued for about an hour and one-half to complete polymerization. Throughout the polymerization procedure the temperature of the reaction mixture was held in the range of 40° C. to 45° C. No insoluble resin was formed.

The reaction mixture was warmed to 60° C. and allowed to settle until clear. The clear solution was decanted away from the sludge. That sludge was drowned with a 5% water solution of hydrochloric acid and was agitated with distilled solvent naphtha. The solution from the sludge was added to the original decanted solution. This entire resin solution was distilled off at a still temperature of 210° C., and that distillate was steam distilled at a still temperature of from 210° C. to 260° C. until a desired softening point of the residual resin was reached. That residual resin was obtained in a yield equal to 83% (168 gm.) the weight of the vinyl cyclohexene and terpenes of the starting mixture. It had a softening point of 117.5° C. (ball and ring) and a color 4 on the Gardner color scale. When dissolved in an equal weight of mineral spirits the resin showed no cloud down to 0° C.

As a check, an identical sample of the gum spirits of turpentine included in the starting mixture was subjected by itself to polymerization under identical procedure as to both polymerization and recovery. From it there was recovered a 60% yield of resin having a softening point of 100° C. (ball and ring).

This lower softening point and low yield from the gum spirits of turpentine is attributable to the preponderant proportion of alpha-pinene in its composition, the alpha-pinene being a poor starting material for resin-forming polymerization in comparison with the minor beta-pinene content of the turpentine. This yield from the gum spirits of turpentine subjected to polymerization by itself illustrates the effect of the vinyl cyclohexene in the mixed starting material.

*Example 2*

A mixture made up of 200 cc. (166 gm.) of acid washed vinyl cyclohexene about 90% pure, and 200 cc. (170 gm.) sulphate turpentine distilling over 90% within the range of 151° C. to 178° C. (vapor temperature) and consisting of about 60% alpha-pinene, 25% beta-pinene and about 10% dipentene, was mixed with 450 cc. of toluol and agitated in a vessel equipped for heat abstraction by the external circulation of a refrigerated brine solution. 25 grams of aluminum chloride was added in small increments during the course of an hour, and was brought by agitation into reactive contact with the vinyl cyclohexene and terpenes of the starting mixture. When all the aluminum chloride had been added, agitation was continued for about 3 hours to complete polymerization. During the polymerization, the temperature was held by circulation of brine within the range of 40° C. to 45° C. Insoluble resin amounting to 18 grams was formed.

Solid resin was recovered by procedure identical with the recovery procedure of Example 1. There was obtained an 86.1% (289 gm.) yield of resin having a softening point of 121° C. (ball and ring), and a color 4 on the Gardner color scale. When dissolved in an equal weight of mineral spirits the resin showed no cloud down to 0° C.

An identical sample of the sulphate turpentine included in the starting mixture was subjected by itself to polymerization under identical procedure as to both polymerization and recovery. From it there was recovered a 65% yield of resin having a softening point of 90° C. (ball and ring).

Example 3

A mixture was made of 100 cc. (83 gm.) vinyl cyclohexene, acid washed and about 90% pure, with 140 cc. (120 gm.) wood spirits of turpentine distilling over 90% within the range of 155° C. to 180° C. The turpentine consisted roughly of about 40% dipentene, about 40% alpha-pinene and about 20% beta-pinene, terpinene, terpinolene, alpha-terpineol and other terpenes. This was mixed with 300 cc. of toluol. During the course of an hour and one-half 20 grams of aluminum chloride was added in small increments and was brought by agitation into reactive contact with the vinyl cyclohexene and terpenes of the starting mixture. When all the aluminum chloride had been added, agitation was continued for another hour and one-half to complete polymerization. During the entire reaction time the temperature was held within a relatively narrow range of about 40° C. to 45° C. No insoluble resin was formed.

The recovery procedure was identical with that of Example 1. This resin was recovered in a yield of 85% (173 gm.). It had a softening point of 108° C. and a color about 8 on the Gardner color scale. When dissolved in an equal weight of mineral spirits the resin showed no cloud to 0° C.

An identical sample of the wood spirits of turpentine included in the starting mixture was subjected by itself to polymerization under identical procedure as to both polymerization and recovery. From it there was recovered a 74% yield of resin having a softening point of 60° C.

Example 4

A mixture was first made of 200 cc. (177 gm.) sulphate turpentine, 140 cc. (119 gm.) gum spirits of turpentine, and 140 cc. (120 gm.) wood spirits of turpentine. This mixture distilled over 90% within the range of 150° C. and 180° C. In line with the proportioning given above it consisted roughly of about 55% alpha-pinene, 21% beta-pinene, 15% dipentene and 9% terpinene, terpinolene, alpha-terpineol and other terpenes. With this mixture of turpentine there was mixed 400 cc. (332 gm.) vinyl cyclohexene acid-washed and about 95% pure. To this mixture there was added 1000 cc. of toluol and to the starting material and diluent. Aluminum chloride in the amount of 60 grams was added in small increments during the course of an hour and one-half, and was brought by agitation into reactive contact with the vinyl cyclohexene and terpenes of the starting mixture. When all the aluminum chloride had been added, agitation was continued for another hour and one-half to complete the polymerization. During the entire reaction time the temperature was held within the range of 40° C. to 45° C. No insoluble resin was formed.

The recovery procedure was identical with that of Example 1.

This resin was recovered in a yield very close to 83% (621 gm.) the weight of the vinyl cyclohexene and terpenes of the starting mixture. It had a softening point of 112° C. (ball and ring) and a color about 5 on the Gardner color scale. When dissolved in an equal weight of mineral spirits the resin showed no cloud down to 0° C.

An identical sample of the mixture of turpentines was subjected by itself to polymerization under identical procedure as to both polymerization and recovery. From it there was recovered a 70% yield of resin, having a softening point of 90° C.

Other mixtures of the turpentines in varied proportions in conjunction with the same proportion of vinyl cyclohexene when subjected to identical conditions of polymerization and recovery all gave good yields of resin having softening points at least as high as 100° C. (ball and ring), all of which like the resins of Examples 1 to 4 inclusive had good solubility in aliphatic hydrocarbon solvents as well as in the aromatic hydrocarbon solvents and other organic solvents of higher solvent power.

In the foregoing Examples 1, 2, 3 and 4 the temperature under which each polymerization was conducted was closely held within the range of 40° C. to 45° C. inclusive. Examples 1, 2, 3 and 4 were paralleled employing a lower temperature within the range of 20° C. to 30° C. inclusive. Under this condition substantially more catalyst was used and the period allowed for polymerization was substantially extended. One result of the lower temperature was the formation of an increased quantity of sludge which separated when the reaction mixture was allowed to settle. From that sludge, however, thermoplastic soluble resin of useful sort was recovered. Also in each instance the yield of soluble resin was slightly lower and the softening point of the resin was slightly higher than in the corresponding example conducted at higher temperature. This procedure at lower polymerizing temperature may be exemplified as follows:

Example 5

A mixture was made using the same grade of vinyl cyclohexene and gum spirits of turpentine from the same lot as in Example 1 and was mixed with the same quantity of toluol.

During the course of an hour and one-half 15 gm. of aluminum chloride was added in small increments and was brought by agitation into reactive contact with the vinyl cyclohexene and terpenes of the starting mixture. When all of the aluminum chloride had been added agitation was continued for about 6 hours to complete polymerization. Throughout the polymerization procedure the temperature of the reaction mixture was held in the range of 20° C. to 30° C. No insoluble resin was formed.

The recovery procedure was identical with that of Example 1.

The resin recovered by distillation was obtained in a yield of 80% (162 gm.) the weight of the vinyl cyclohexene and terpenes of the starting mixture. It had a melting point of 121° C. (ball and ring) and a color 3 on the Gardner color scale. When dissolved in an equal weight of mineral spirits the resin showed no cloud down to 0° C.

*Example 6*

A mixture was made up on the same vinyl cyclohexene sulphate turpentine and diluent and in the same proportions and quantities as in Example 2. The catalyst was 42 gm. of aluminum chloride which was added in small increments during the course of an hour and which was brought by agitation into reactive contact with vinyl cyclohexene and terpenes of the starting mixture. When all of the aluminum chloride had been added agitation was continued for about 8 hours to complete polymerization. During the polymerization the temperature was held within the range of 20° C. to 30° C. About the same quantity of insoluble resin as in Example 2 was formed.

The recovery procedure was identical with that of Example 1.

There was obtained by distillation an 83% yield (279 gm.) of soluble thermoplastic resin having a softening point of 125° C. (ball and ring) and a color 3 on the Gardner color scale. This soluble thermoplastic resin when dissolved in an equal weight of mineral spirits showed no cloud down to 0° C.

*Example 7*

A mixture was made of the same vinyl cyclohexene and wood spirits of turpentine and in the same proportions and quantities as in Example 3. During the course of an hour and one-half 30 gm. of aluminum chloride was added in small increments and was brought by agitation into reactive contact with the vinyl cyclohexene and terpenes of the starting mixture. When all of the aluminum chloride had been added agitation was continued an additional period of 8 hours to complete polymerization. During the entire reaction time the temperature was held within a range of 20° C. to 30° C. No insoluble resin was formed.

The recovery procedure was identical with that of Example 1. The resin recovered by distillation was in the yield of 82% (166 gm.). It had a softening point of 113° C. (ball and ring) and a color of about 8 on the Gardner color scale. When dissolved in an equal weight of mineral spirits the resin showed no cloud down to a temperature of 0° C.

*Example 8*

A mixture of the same ingredients and in the same proportions and quantities of vinyl cyclohexene, turpentines and diluent as in Example 4 was made. The polymerization procedure was like that of Example 4 except that 90 gm. of aluminum chloride was used. The reaction time after the addition of the catalyst was completed was extended to 8 hours and the temperature throughout the polymerization was held within the range of 20° C. to 30° C. No insoluble resin was formed.

The recovery procedure was identical with that of Example 1.

The resin recovered by distillation was in a yield of 80% (599 gm.) the weight of the vinyl cyclohexene and terpenes of the starting mixture. It had a softening point of 117° C. (ball and ring) and a color about 5 on the Gardner color scale. When dissolved in an equal weight of mineral spirits the resin showed no cloud down to a temperature of 0° C.

It will be noted that in all the foregoing examples the proportioning is from about 40% of vinyl cyclohexene in the blend of polymerizables to about 50% of the vinyl cyclohexene, the latter being about the maximum content of vinyl cyclohexene which desirably may be included in the mixture. This is because in that proportioning there was an appreciable formation of insoluble resin which becomes substantial as the content of vinyl cyclohexene is increased about 50% by weight of the whole. It has been stated above that even a relatively small inclusion of vinyl cyclohexene with a terpene content consisting of one or more of the specified turpentines increases the yield and raises the softening point of the hard resin polymers as compared with those obtained by polymerizing the terpene starting material alone. To exemplify this fact two examples utilizing the two different temperature ranges of the examples given above may be here given. These examples are based upon the mixture of all three turpentines as given in Example 4, it being implicit in the context that in admixture with vinyl cyclohexene mixtures of any two of the turpentines or any one of the turpentines would act analogously.

*Example 9*

In this example a mixture of turpentines of the same sort as in Example 4 was made, using the same proportions and quantities of the several turpentines as in that example. The turpentines were, however, mixed with 100 cc. (83 gm.) of vinyl cyclohexene and 600 cc. of toluol. Aluminum chloride in the amount of 50 gm. was added in small increments during the course of an hour and one-half and was brought by agitation into reactive contact with the vinyl cyclohexene and terpenes of the starting mixture. When all of the aluminum chloride had been added, agitation was continued for another 3 hours to complete the polymerization. During the entire reaction time the temperature was held within the range of 40° C. to 45° C. No insoluble resin was formed.

The recovery procedure was identical with that of Example 1.

The resin recovered by distillation was in a yield of 78% (389 gm.) the weight of the turpentines and vinyl cyclohexene. It had a softening point of 96° C. (ball and ring) and a color 8 on the Gardner color scale. This resin when dissolved in an equal weight of mineral spirits showed no cloud down to a temperature of 0° C.

*Example 10*

A reaction liquid identical with that of Example 9 was made up. The polymerization procedure was the same as in Example 9 except that 80 gm. of aluminum chloride was used, the temperature was held within the range of 20° C. to 30° C. and the reaction time was extended to 8 hours. No insoluble resin was formed.

The recovery procedure was identical with that of Example 1.

The resin recovered by distillation was in a yield of 75% (369 gm.) the weight of the vinyl cyclohexene and terpenes of the starting mixture. It had a softening point of 102° C. (ball and ring) and a color 6 on the Gardner color scale. When dissolved in an equal weight of mineral spirits the resin showed no cloud down to a temperature of 0° C.

Examples 9 and 10 illustrates that the addition of lesser proportions of vinyl cyclohexene serves appreciably to increase the yield and raise the softening point of the hard resin polymers formed by the polymerization as compared with the yield and softening point of the polymers obtained by polymerization of the terpenes alone. Comparison is given by the results of a polymerization conducted on the turpentines without addition of vinyl cyclohexene as included in the discussion of Example 4.

Examples 5, 6, 7, 8 and 10 illustrate the fact that with lower reaction temperature it is desirable to use an increased quantity of catalyst and to continue the polymerization period for an extended length of time in order to secure results close to those obtained at higher temperature. As noted above the vinyl cyclohexene is relatively sluggish in its response to polymerization promoting stimuli. It will be noted that in Examples 5, 6, 7, 8 and 10 in which respectively the proportioning of vinyl cyclohexene and terpenes is identical with that of Examples 1, 2, 3, 4 and 9 the lower temperature of polymerization gives a resin of somewhat higher softening point, obtained in slightly decreased yield. At the expense of an even more extended reaction period the polymerization at the lower temperature gives an almost equal yield of resin as compared with the higher temperature, while obtaining the benefit of higher softening point.

Using the same proportions of vinyl cyclohexene and terpenes as in Examples 1, 2, 3, 4 and 9 polymerization was conducted at a temperature within the range of 10° C. to 15° C. In each instance catalyst in a quantity equal to 18% the weight of the combined vinyl cyclohexene and terpenes was used and the polymerization period after addition of the catalyst was extended to 18 hours. The result was to obtain yields approximately identical with those of Examples 5, 6, 7, 8 and 10 with an increase of about 4° C. in the softening point of the resin.

Duplication of the procedures given above but using aluminum bromide instead of aluminum chloride as catalyst gave almost identical results. The other acid-reacting metal halides are usable in the process. Even when employed in increased quantity they give lower yields of resin.

The resin produced from a mixed vinyl cyclohexene and turpentine starting material corresponds in most particulars to terpene resins. In all proportioning of the two ingredients of the starting material the resin is usable in all ways in which a straight terpene resin is usable, as for example in coating compositions, hot melt coatings, adhesives, rubber compounding, chewing gum bases and the like. Guides to satisfactory procedure in such uses are found in patents to Frank W. Corkery and Samuel G. Burroughs No. 2,320,717; No. 2,319,389; No. 2,320,716; No. 2,320,718; and No. 2,357,811.

Although terpene resins as carefully produced are considered to possess good color stability, the resin produced by polymerizing a mixture of vinyl cyclohexene and a turpentine or turpentines exhibits higher resistance to color development than do the straight terpene resins, including beta-pinene resin.

It has been noted above that it is desirable in the process to use an inert solvent diluent of low aniline point. I have found it preferable to use such solvent diluents as have an A. S. T. M. D 611-46 T aniline point no higher than 35° C. Most of the commercially desirable solvents of this sort have aniline points by the above determination falling within the range of about 15° C. to 35° C.

Throughout the specification "aniline point," where not specifically qualified by the method of its determination, is to be understood as determined by the A. S. T. M. D 611-46 T aniline point method. Where not specifically qualified in the specification, "softening point" is to be understood as determined by the ball and ring method of softening point determination. Where not specifically qualified in the specification, distillation temperatures are to be understood as taken at 750 mm. of mercury. Where not specifically qualified proportions are to be understood as proportions by weight. In any example in which there is no notation as to the formation of insoluble resin no insoluble resin was formed.

In my companion applications Serial No. 45,786, Serial No. 45,784, Serial No. 45,781, filed of even date herewith, I have disclosed the polymerization of the turpentine components beta-pinene, alpha-pinene, and commercial grade dipentene individually in admixture with the defined cyclic mono-olefine in which a vinyl group has been substituted. Herein the disclosure relates to the polymerization of turpentines from which those individual terpenes are separable, and mixtures of those turpentines, with the defined cyclic mono-olefine, 1-vinyl cyclohexene-3, designated throughout the specification simply as vinyl cyclohexene, and to the resins produced by that polymerization.

I claim as my invention:

1. The method of producing hard resin polymers by bringing a mixture of 1-vinyl cyclohexene-3 (cyclic dimer of butadiene) and a turpentine selected from the group consisting of gum spirits of turpentine, sulphate turpentine and wood spirits of turpentine derived by solvent extraction from dry wood of conifers, and mixtures of them, in a proportion of vinyl cyclohexene equal to from 10% to 50% the weight of the blend into reactive contact with an acid-reacting metal halide polymerization catalyst in the presence of an inert solvent diluent for the polymers of the said vinyl cyclohexene and turpentine, to form hard resin polymers of vinyl cyclohexene and turpentine in solution, and recovering the resin polymers so formed.

2. The method of producing hard resin polymers by bringing a mixture of 1-vinyl cyclohexene-3 (cyclic dimer of butadiene) and a turpentine selected from the group consisting of gum spirits of turpentine, sulphate turpentine and wood spirits of turpentine derived by solvent extraction from dry wood of conifers, and mixtures of them, in a proportion of vinyl cyclohexene equal to from 25% to 45% the weight of the blend into reactive contact with an acid-reacting metal halide polymerization catalyst in the presence of an inert solvent diluent for the polymers of the said vinyl cyclohexene and turpentine, to form hard resin polymers of vinyl cyclohexene and turpentine in solution, and recovering the resin polymers so formed.

3. The method of producing hard resin polymers by bringing a mixture of 1-vinyl cyclohexene-3 (cyclic dimer of butadiene) and a turpentine selected from the group consisting of gum spirits of turpentine, sulphate turpentine and wood spirits of turpentine derived by solvent extraction from dry wood of conifers, and mixtures of them, in a proportion of vinyl cyclohexene equal to from 10% to 50% the weight of the blend into reactive contact with aluminum chloride polymerization catalyst in the presence of an inert solvent diluent for the polymers of the said vinyl cyclohexene and turpentine, to form hard resin polymers of vinyl cyclohexene and turpentine in solution, and recovering the resin polymers so formed.

4. The method of producing hard resin polymers by bringing a mixture of 1-vinyl cyclohexene-3 (cyclic dimer of butadiene) and a turpentine selected from the group consisting of gum spirits of turpentine, sulphate turpentine and wood spirits of turpentine derived by solvent extraction from dry wood of conifers, and mixtures of them, in a proportion of vinyl cyclohexene equal to from 10% to 50% the weight of the blend into reactive contact with aluminum bromide polymerization catalyst in the presence of an inert solvent diluent for the polymers of the said vinyl cyclohexene and turpentine to form hard resin polymers of vinyl cyclohexene and turpentine in solution, and recovering the resin polymers so formed.

5. The method of producing hard resin polymers by bringing a mixture of 1-vinyl cyclohexene-3 (cyclic dimer of butadiene) and a turpentine selected from the group consisting of gum spirits of turpentine, sulphate turpentine and wood spirits of turpentine derived by solvent extraction from dry wood of conifers, and mixtures of them, in a proportion of vinyl cyclohexene equal to from 25% to 45% the weight of the blend into reactive contact with aluminum chloride polymerization catalyst in the presence of an inert solvent diluent for the polymers of the said vinyl cyclohexene and turpentine to form hard resin polymers of vinyl cyclohexene and turpentine in solution, and recovering the resin polymers so formed.

6. The method of producing hard resin polymers by bringing a mixture of 1-vinyl cyclohexene-3 (cyclic dimer of butadiene) and a turpentine selected from the group consisting of gum spirits of turpentine, sulphate turpentine and wood spirits of turpentine derived by solvent extraction from dry wood of conifers, and mixtures of them, in a proportion of vinyl cyclohexene equal to from 25% to 45% the weight of the blend into reactive contact with aluminum bromide polymerization catalyst in the presence of an inert solvent diluent for the polymers of the said vinyl cyclohexene and turpentine to form hard resin polymers of vinyl cyclohexene and turpentine in solution, and recovering the resin polymers so formed.

7. The resin produced by the process of claim 1.

SAMUEL G. BURROUGHS.

REFERENCES CITED

The following references are of record in the file of this patent:

UNITED STATES PATENTS

| Number | Name | Date |
| --- | --- | --- |
| 2,346,791 | Rummelsburg | Apr. 18, 1944 |
| 2,349,210 | Traylor | May 16, 1944 |
| 2,383,084 | Rummelsburg | Aug. 21, 1945 |
| 2,401,414 | Doumani | June 4, 1946 |
| 2,475,234 | Gleason et al. | July 5, 1949 |
| 2,487,898 | Rummelsburg | Nov. 15, 1949 |

FOREIGN PATENTS

| Number | Country | Date |
| --- | --- | --- |
| 614,781 | Great Britain | Dec. 22, 1948 |

OTHER REFERENCES

Laitinen et al.: Ind. and Engr. Chem., Anal. Ed., vol. 17, pp. 769–772 (Dec. 1945).